(12) United States Patent
Ichikawa

(10) Patent No.: US 9,703,376 B2
(45) Date of Patent: Jul. 11, 2017

(54) MANIPULATION SYSTEM OPERABLE BY EYEWEAR TYPE TERMINAL DEVICE

(71) Applicant: KYOCERA Document Solutions Inc., Osaka (JP)

(72) Inventor: Daisuke Ichikawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/198,834

(22) Filed: Jun. 30, 2016

(65) Prior Publication Data

US 2017/0003743 A1    Jan. 5, 2017

(30) Foreign Application Priority Data

Jun. 30, 2015  (JP) ................................. 2015-131513

(51) Int. Cl.
| | |
|---|---|
| *G06F 3/01* | (2006.01) |
| *G06F 3/0482* | (2013.01) |
| *H04N 1/00* | (2006.01) |
| *G06K 9/00* | (2006.01) |

(52) U.S. Cl.
CPC ............ *G06F 3/013* (2013.01); *G06F 3/0482* (2013.01); *G06K 9/00604* (2013.01); *H04N 1/00381* (2013.01); *H04N 1/00413* (2013.01); *H04N 1/00482* (2013.01); *H04N 1/00493* (2013.01); *H04N 2201/0075* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 9,096,920 B1* | 8/2015 | Gomez | ..................... C23C 4/06 |
| | | | 348/78 |
| 2014/0126018 A1* | 5/2014 | Sugimoto | ............... G06F 3/013 |
| | | | 358/1.15 |
| 2015/0138232 A1* | 5/2015 | Sugimoto | ............. G06F 3/1205 |
| | | | 345/633 |

FOREIGN PATENT DOCUMENTS

JP    2004-180208 A    6/2004

* cited by examiner

*Primary Examiner* — Beniyam Menberu
(74) *Attorney, Agent, or Firm* — Hawaii Patent Services; Nathaniel K. Fedde; Kenton N. Fedde

(57) ABSTRACT

Provided is a manipulation system that is capable of coping with a manipulation that deals with many selectable setting values in an easy way using an eyewear type terminal device. The eyewear type terminal device includes a view capturing part, a screen display part, a screen creation part that creates a screen on which selection items are arranged and display such a screen on the screen display part, a fixation point detection part, a sample data cutting out part cut out sample data from the front vision field image, and a communication part, the image forming apparatus performs an operation based on the selection item that is received from the eyewear type terminal device and identify a setting value candidate treated as the selection item based on the sample data for transmission to the eyewear type terminal device.

3 Claims, 14 Drawing Sheets

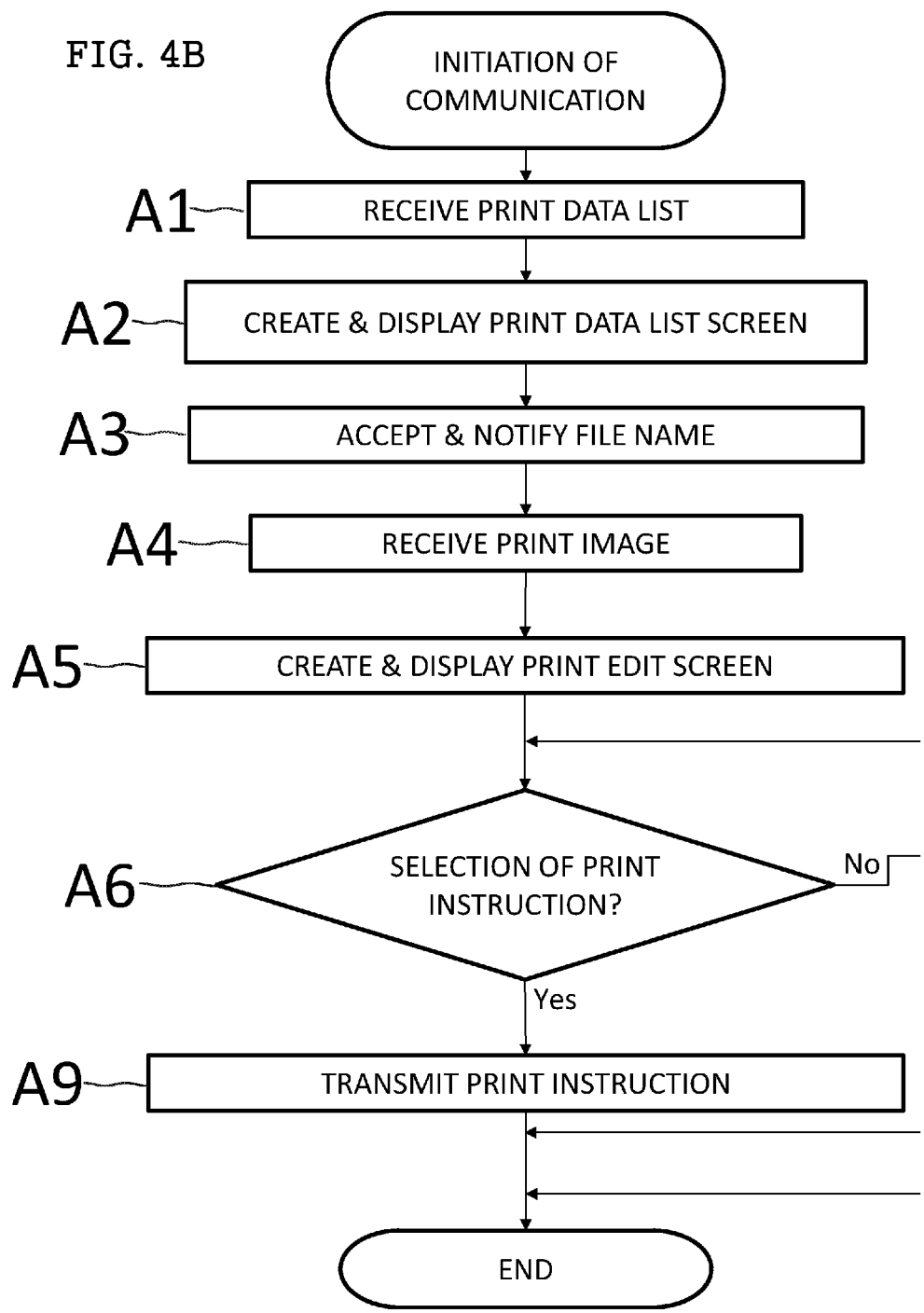

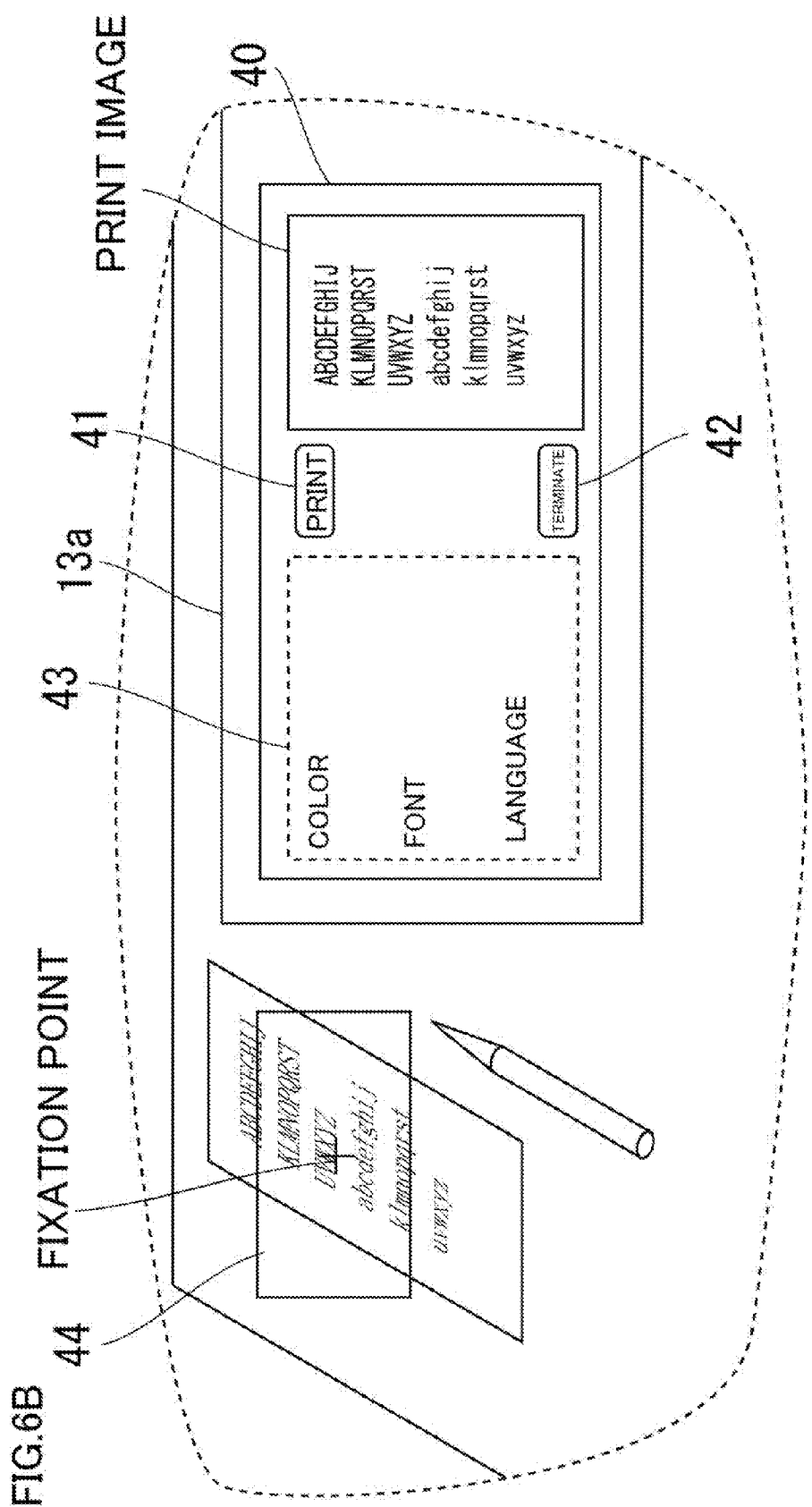

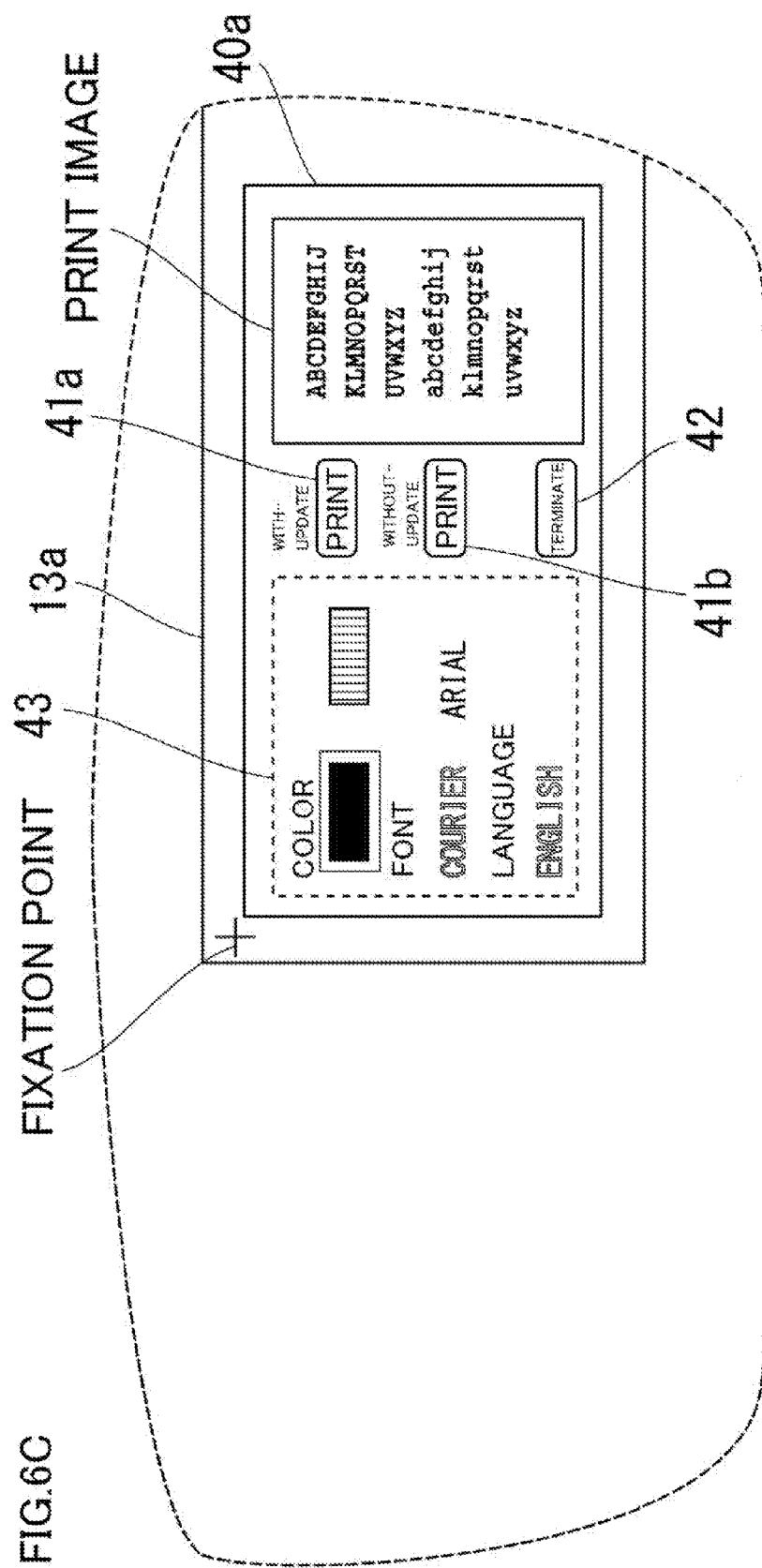

MANIPULATION SYSTEM OPERABLE BY EYEWEAR TYPE TERMINAL DEVICE

INCORPORATION BY REFERENCE

This application is based on and claims the benefit of priority from Japanese Patent Application No. 2015-131513 filed on Jun. 30, 2015, the contents of which are hereby incorporated by reference.

BACKGROUND

The present disclosure relates to a manipulation system in which a main body device is configured to be operated by an eyewear type terminal device that is mounted on a user's head (hereinafter, which will be simply referred to as "eyewear type terminal device").

Recently, there have been proposed head-mount type display devices that provide an eye-controlled operation. In such head mount type display devices, markers are indicated which correspond to operation details and an operation is conducted which correspond to one of the markers upon detection of a user's fixation over a period of time.

SUMMARY

The present disclosure provides a manipulation system that includes: a main body device; and an eyewear type terminal device that is configured to be mounted on a head of a user, the eyewear type terminal device including a view capturing part that is configured to capture an image of a front vision field of the user, an eyeball capturing part that is configured to capture an image of an eyeball of the user, a screen display part that is configured to be visible for the user, a screen creating part that is configured to create a screen on which selection items are arranged and display such a screen on the screen display part, a fixation point detecting part that is configured to detect a fixation point of the user which is positioned on the screen display part based on the image captured by the eyeball capturing part and to accept an selection of one of the selection items which the user fixates, the fixation point detecting part being configured to identify the fixated point position on the image that is captured by the view capturing part based on the eyeball capturing part, a sample data cutting out part that is configured to cut out sample data from the image that is captured by the view capturing part based on the fixated point position that is identified by the fixation point detecting part, and a terminal communication part that is configured to transmit, to the main body device, the one of the selection items which is accepted, as a selection, by the fixation point detecting part and the sample data that is cut out by the sample data cutting out part, the main body device including a control part that is configured to execute an operation based on the selected one of the selection items which is received from the eyewear type terminal device, a sample data analyzing part that is configured to identify a setting value candidate treated as the selected one of the selection items which is to be displayed on the screen display part of the eyewear type terminal device, and a main body communication part that is configured to transmit the setting value candidate to the eyewear type terminal device.

BRIEF DESCRIPTION OF THE DRAWINGS

FIGS. 4B-4D are partial views that collectively form the flowchart depicted in FIG. 4A;

FIG. 6B is an illustration of an example that is indicated on a screen display part shown in FIG. 2; and FIG. 6C is an illustration of an example that is indicated on a screen display part shown in FIG. 2.

DETAILED DESCRIPTION

Hereinbelow, with reference to the attached drawings, a description is made in detail as to an exemplary embodiment of the present disclosure. It is to be noted that the elements of same functions are referred to by the same reference codes in the following exemplary embodiment.

Figure 1:
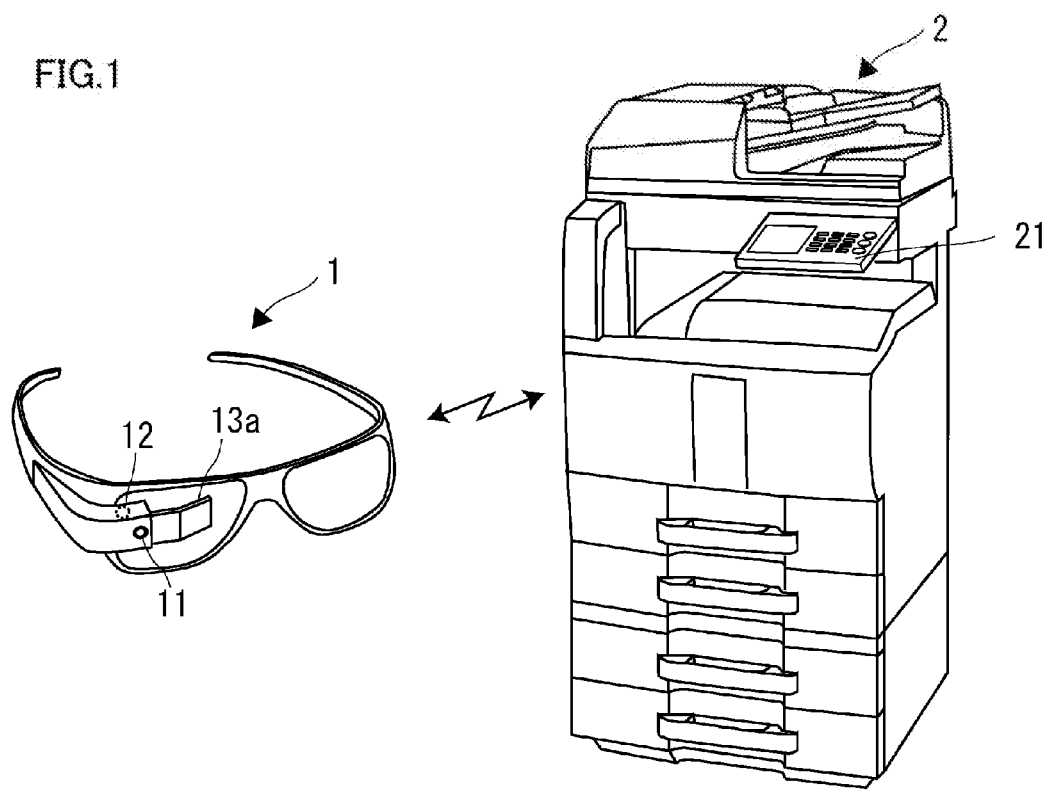
FIG. 1 is a system configuration diagram of a manipulation system according to an exemplary embodiment of the present disclosure.

A manipulation system of the present exemplary embodiment includes as illustrated in FIG. 1, an eyewear type terminal device 1 and an image forming apparatus 2, as a main body device, which is configured to be connected to the eyewear type terminal device 1 over a network such as a wireless communication system. The image forming apparatus 2 is equipment with a print function which is in the form of, for example, a printer, a copier, or an MFP (Multifunction Peripheral/Printer/Product). The eyewear type terminal device 1 is a device that is designed to edit print data to be printed out by the image forming apparatus 2.

Figure 2:
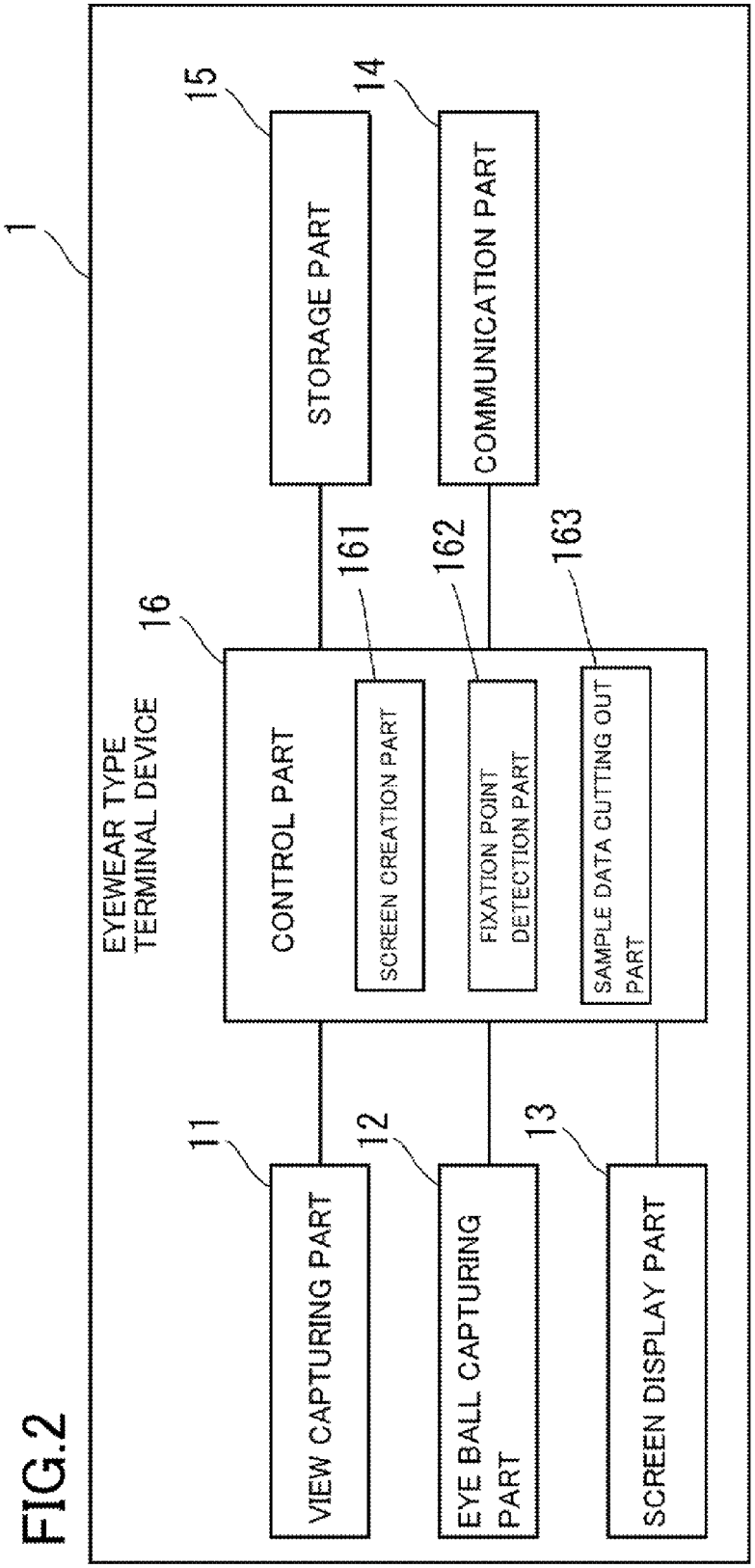
FIG. 2 is a block diagram that is indicative of a configuration of an eyewear type terminal device shown in FIG. 1.

The eyewear type terminal device 1 is in the form of a wearable eyewear type terminal device to be mounted on a head of a user. As shown in FIG. 2, the eyewear type terminal device 1 includes a view capturing part 11, an eyeball capturing part 12, a screen display part 13, a communication part 14, a storage part 15, and a control part 16.

The view capturing part 11 is, as shown in FIG. 1, in the form of a camera that is made up of image capturing elements, such as a CCD camera or a CMOS camera, which is directed frontward of the eyewear type terminal device 1 and is configured to capture an image of a front vision field of the user. Hereinbelow, the image that is captured by the view capturing part 11 will be referred to as a "view image".

The eyeball capturing part 12 is, as shown in FIG. 1, in the form of a camera that is made up of image capturing elements, such as a CCD camera or a CMOS camera, which is directed rearward of the eyewear type terminal device 1 and is configured to capture an image of an eyeball of the user U. Hereinbelow, the image that is captured by the eyeball capturing part 12 will be referred to as a "fixation point detection image".

The screen display part 13 includes a half mirror 13a, as an indication screen, which is located at an immediate front portion of the eyeball when the eyewear type terminal device 1 is mounted on a head of the user as shown in FIG. 1, and is configured to provide various screens that are visible from the user when image light beams are projected on the half mirror 13a.

The communication part 14 has a function to transmit various data to and receive various data from the image forming apparatus 2 over a wireless communication such as a wireless LAN.

The storage part 15, which is in the form of a semiconductor memory, is a storing means and is configured to store print data list or print image that are received from the image forming apparatus 2.

The control part 16, which is connected to the view capturing part 11, the eyeball capturing part 12, the screen display part 13, the communication part 14, and storage part 15, is configured to carry out an overall operation control of the eyewear type terminal device 1. The control part 16 is in the form of an information processing device such as a computer that includes, for example, a CPU (Central Processing Unit), a ROM (Read Only Memory), and a RAM (Random Access Memory). In the ROM, there is stored a control program for executing the operation control of the eyewear type terminal device 1. The CPU of the control part 16 is configured to read out the control program stored in the ROM and load the resulting control program on the RAM to carry out the overall operation control of the eyewear type terminal device 1. The control part 16 is also configured to act as a screen creating part 161, a fixation point detecting part 162, and a sample data cutting out part 163.

The screen creating part 161 is configured to create a print data list screen 30 on which is allocated a print data list that is received from the image forming apparatus 2 and to cause the half mirror 13a of the screen display part 13 to display the resulting print data list screen 30. The screen creating part 161 is also configured to create a print image edit screen 40 on which is allocated a print image that is received from the image forming apparatus 2 and to cause the half mirror 13a of the screen display part 13 to display the resulting print image edit screen 40.

The fixation point detecting part 162 is configured to detect, based on an fixation point detect image, user's fixation point that centers each of various screens on the half mirror 13a and a user's fixation point on view image.

The sample data cutting part 163 is configured to cut out a designated region including the fixation point identified by the fixation point detecting part 162 (for example, a rectangular region whose center is a fixed position and which has a specified area) as sample data.

Figure 3:
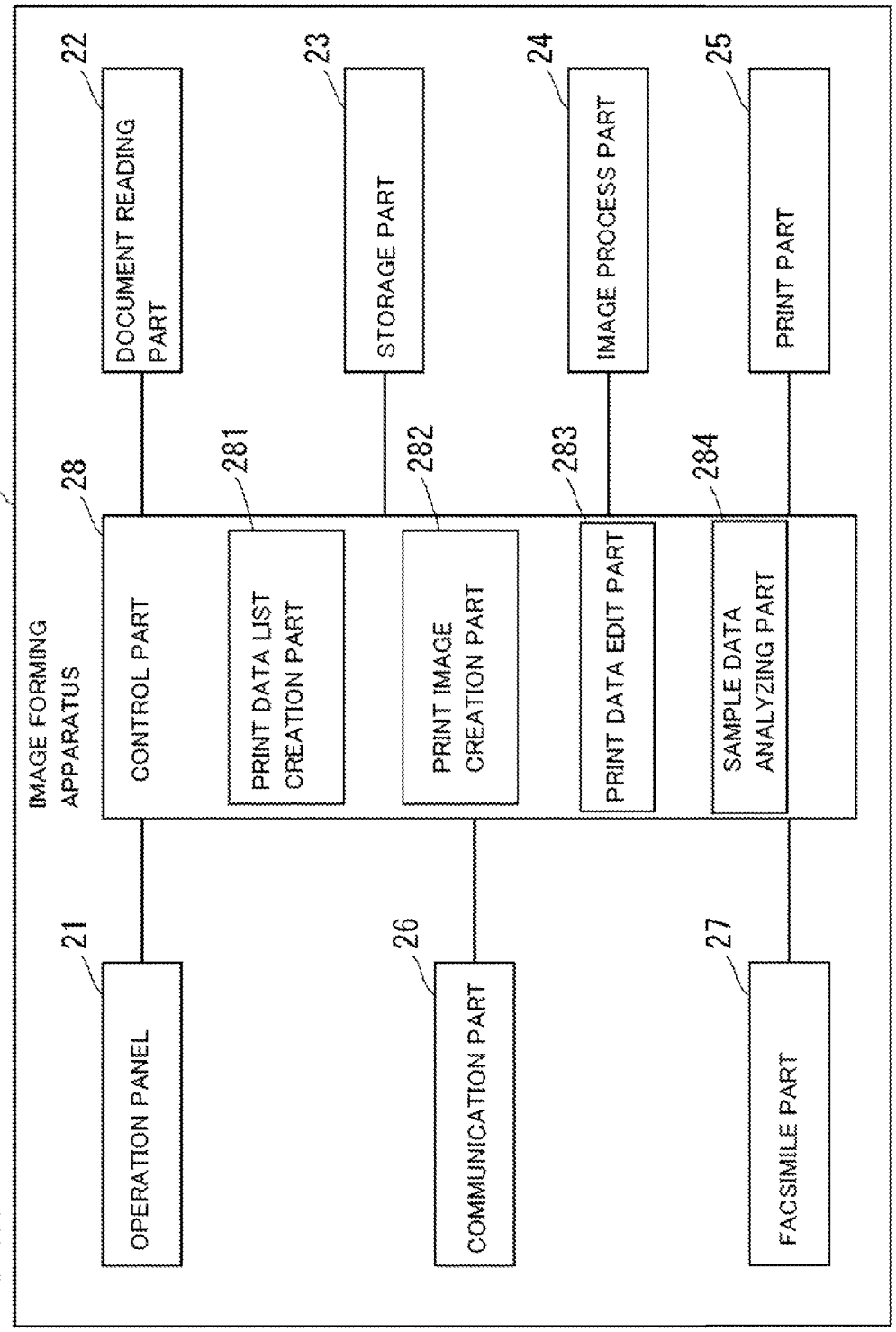
FIG. 3 is a block diagram that is indicative of a configuration of an image forming apparatus shown in FIG. 1.

Next, with reference to FIG. 3, a description is made as to the image forming apparatus 2. The image forming apparatus of the present exemplary embodiment, which is in the form of an MFP (Multifunction Peripheral/Printer/Product), includes an operation panel 21, a document reading part 22, a storage part 23, an image forming part 24, a print part 25, a communication part 26, a facsimile part 27, and a control part 28.

The operation panel 21 includes a touch panel and operation button part. The touch panel, which has a display part for displaying various keys and an image forming process status, is provided with at a surface of the display part with a transparent pressure sensitive sensor, so as to function as display means and input means. The touch panel is configured to detect a touch operation that is conducted on the display surface, transmit a signal that corresponds to a position at which the touch operation is detected, and then accept the operation that is conducted to one of the various keys. The operation button part is provided with a collection of various operation keys that include, for example, numeric keys for inputting numerals that are indicative of the number of papers to be printed, a reset key that is configured to input an instruction to initialize setting information, a stop key that is configured to stop copy operation, and a start key that is configured to input an output instruction for initiating a print operation.

The document reading part 22 is a scanner that is configured to read an image of a document which is fed by a document carrying device (not shown) or which is placed on a platen glass by a user, the reading of the document being achieved by irradiating an optical beam to the document and receiving the reflected optical beams.

The storage part 23, which is storing means in the form of, for example, a semiconductor memory and a HDD, acts as storing means for accumulating document data containing a character string which the communication part 26 receives, the image data that is read by the document reading part 22, and image data which the communication part 26 or the facsimile part 27 receives, as print data. The storage part 23 is also configured to store a plurality of different fonts (Courier, Arial, and so on). Furthermore, the storage part 23 stores a dictionary for translating the character string in the document data into another language.

The image process part 24 is means for providing a specific image process for image data. The image process part 24 provides image improvement processes that include, for example, an enlargement/reduction process, an image density adjustment, and a gradation adjustment.

The print part 25 is printing means for printing the image data that is stored in the storage part 23. For example, the print part 25 is configured to form a latent image on a surface of a photosensitive drum based on the image data that is read from the storage part 23, perform an image formation in which the latent image is formed into a toner image using a toner, transfer the toner image from the photosensitive drum on to a recording paper, fix the toner image on the recording paper, and discharge the resulting recording paper. The print part 25 is also configured to have a function to form toner images using respective toners of cyan, magenta, yellow, black, and so on, and fix these toner images in a superimpose manner on to a recording paper, thereby achieving a full color print.

The communication part 26 is configured to have a function to transmit various data to and receive various data from the eyewear type terminal device 1 and/or an external terminal device over a wireless communication system such as a wireless LAN. In addition, the communication part 26 is configured to have a function to transmit various data to and receive various data from an external terminal device over a wired cable such as a LAN cable.

The facsimile part 27, which has a modem, is provided with facsimile transmission and receipt functions, the facsimile transmission function being designed to generate a facsimile signal from the image data read by the document reading part 22 or the image data stored in the storage part 23 for transmission of the resulting signal to a public telephone network, the facsimile receipt function being designed to receive a facsimile signal from the public telephone network.

The control part 28 is connected to each of the operation panel 21, the document reading part 22, the storage part 23, the image process part 24, the print part 25, the communication part 26, and the facsimile part 27. The control part 28 is in the form of an information processing device such as a computer that includes, for example, a CPU (Central Processing Unit), a ROM (Read Only Memory), and a RAM (Random Access Memory). In the ROM, there is stored a control program for executing the operation control of the image forming apparatus 2. The CPU of the control part 28 is configured to read out the control program stored in the ROM and load the resulting control program on the RAM to carry out the overall operation control of the image forming apparatus 2. The control part 28 is also configured to act as a print data list creation part 281, a print image creation part 282, a print data edit part 283, and a sample data analyzing part 284.

The print data list creation part 281 is configured to identify editable print data from among the print data stored in the storage part 23 and create a print data list that is indicative of file names of the specified print data. The editable print data is document data that includes a character string. This document data is editable in color, font, and language in the character string.

The print image creation part 282 is configured to create a print image of the print data whose file name is notified from the eyewear type terminal device 1 and transmit the created print image, via the communication part 26, to the eyewear type terminal device 1. The print image creation part 282 is also configured to create a print image of change candidate print data that is created by the print data edit part 283 and transmit the created print image, via the communication part 26, to the eyewear type terminal device 1.

The print data edit part 283 is configured to create change candidate print data by changing the print data whose file name is notified from the eyewear type terminal device 1 such that the change candidate print data include a change candidate language, a change candidate font, and a change candidate color which are identified by the sample data analyzing part 284.

The sample data analyzing part 284 is configured to identify the change candidate language, the change candidate font, and the change candidate color based on the sample data that is received from the eyewear type terminal device 1.

Next, with reference to FIG. 4A, FIG. 5A, and FIG. 6A to FIG. 6C, a description is made in detail as to how the manipulation system of the present exemplary embodiment conducts a print operation of printing out the print data. Immediately when a communication is established between the eyewear type terminal device 1 and the image forming apparatus 2, the control part 28 of the image forming apparatus 2 begins to act as the print data list creation part 281. The communication between the eyewear type terminal device 1 and the image forming apparatus 2 is initiated when, for example, the user who mounts thereon the eyewear type terminal device 1 have a view of the image forming apparatus 2. In this case, the control part 16 of the eyewear type terminal device 1, which has a function of recognizing a shape of the image forming apparatus 2, recognizes the image forming apparatus 2 within the viewed image, causing a communication to initiate with the image forming apparatus 2. It is to be noted that providing an operation part is available which is configured to instruct the eyewear type terminal device 1 to initiate a communication with the image forming apparatus 2. On the other hand, the operation panel 21 of the image forming apparatus 2 may be configured to issue an instruction for initiating a communication to the eyewear type terminal device 1.

Figure 5A:
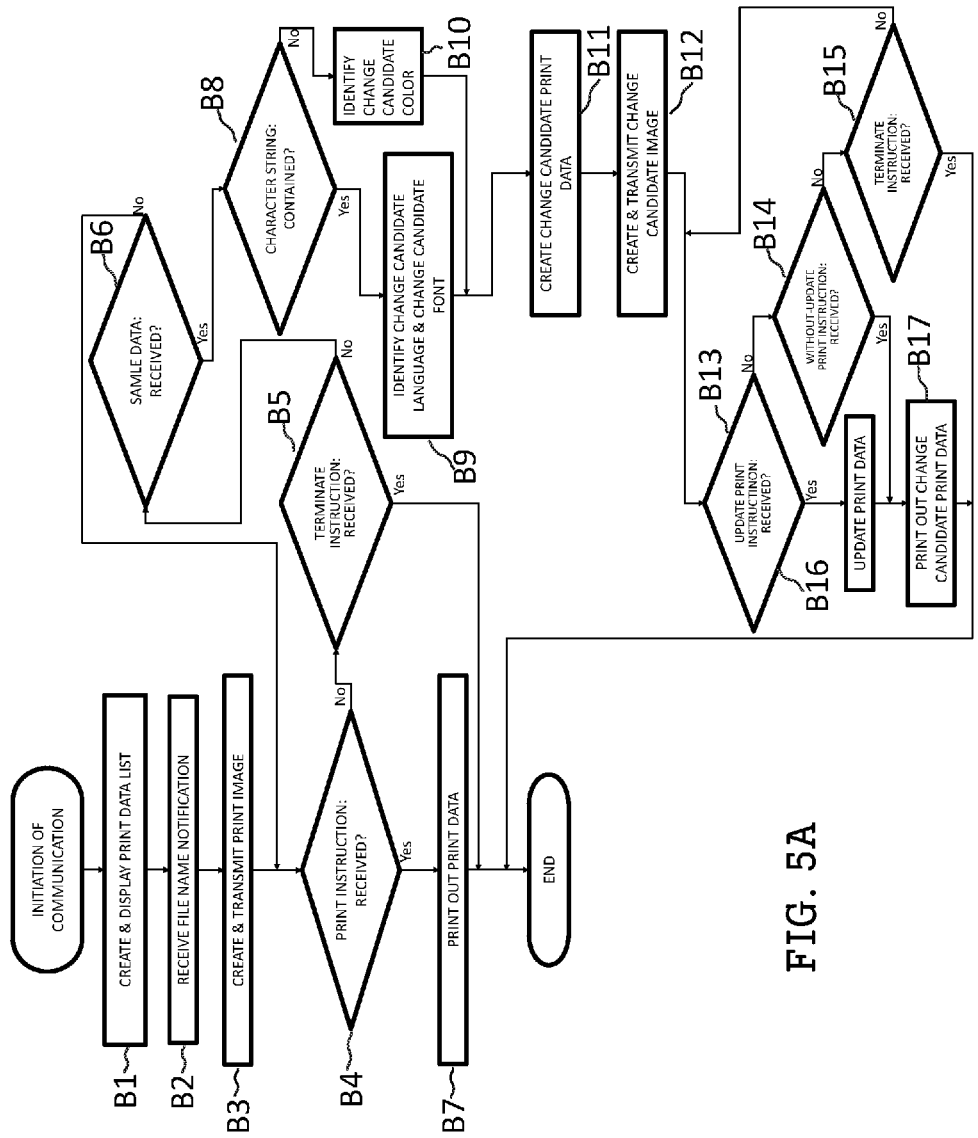
FIG. 5A is a flowchart that illustrates how print data undergoes a print operation at the image forming apparatus shown in FIG. 1.
Figure 5B:
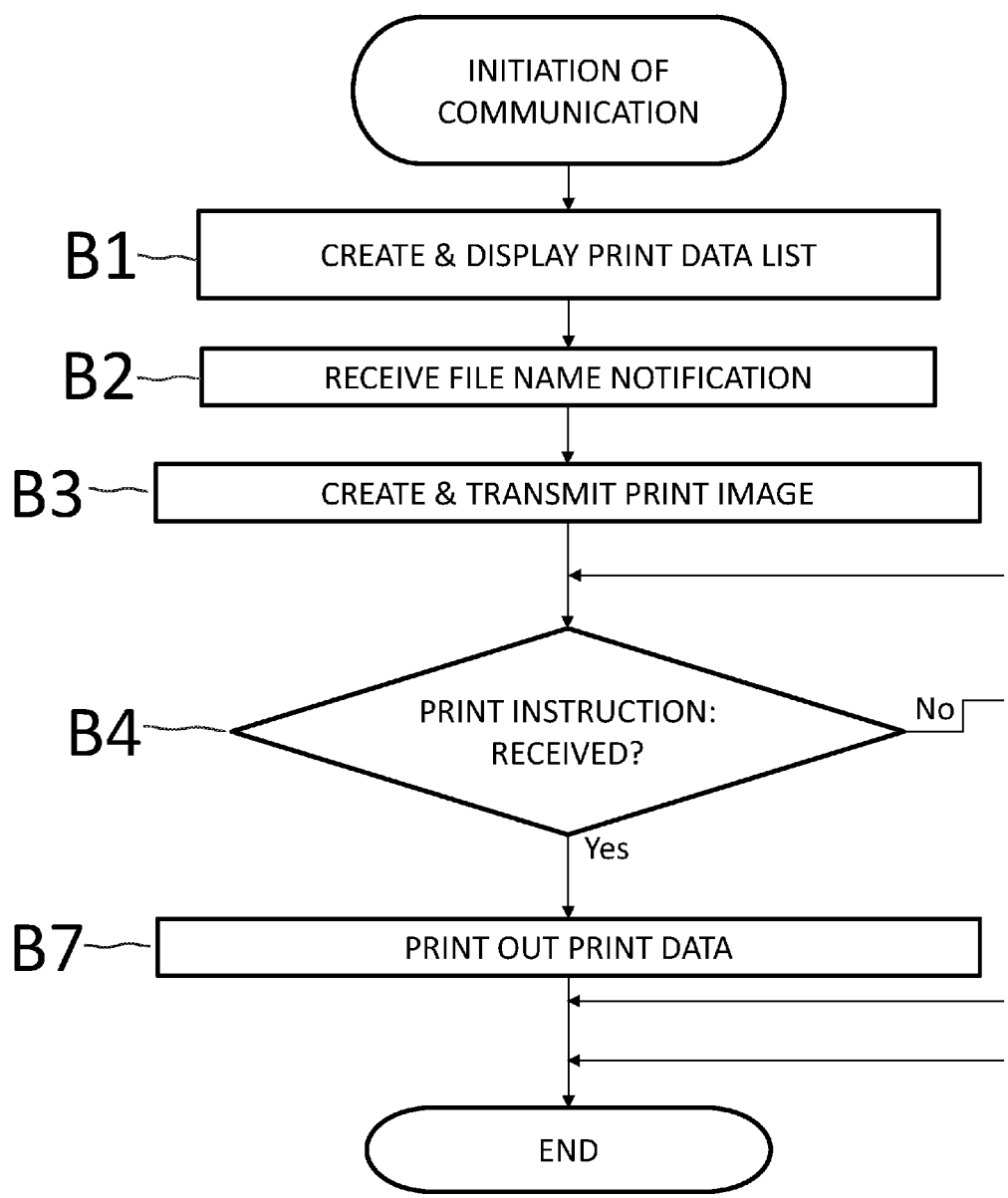
FIGS. 5B-5D are partial views that collectively form the flowchart depicted in FIG. 5A.
Figure 5C:
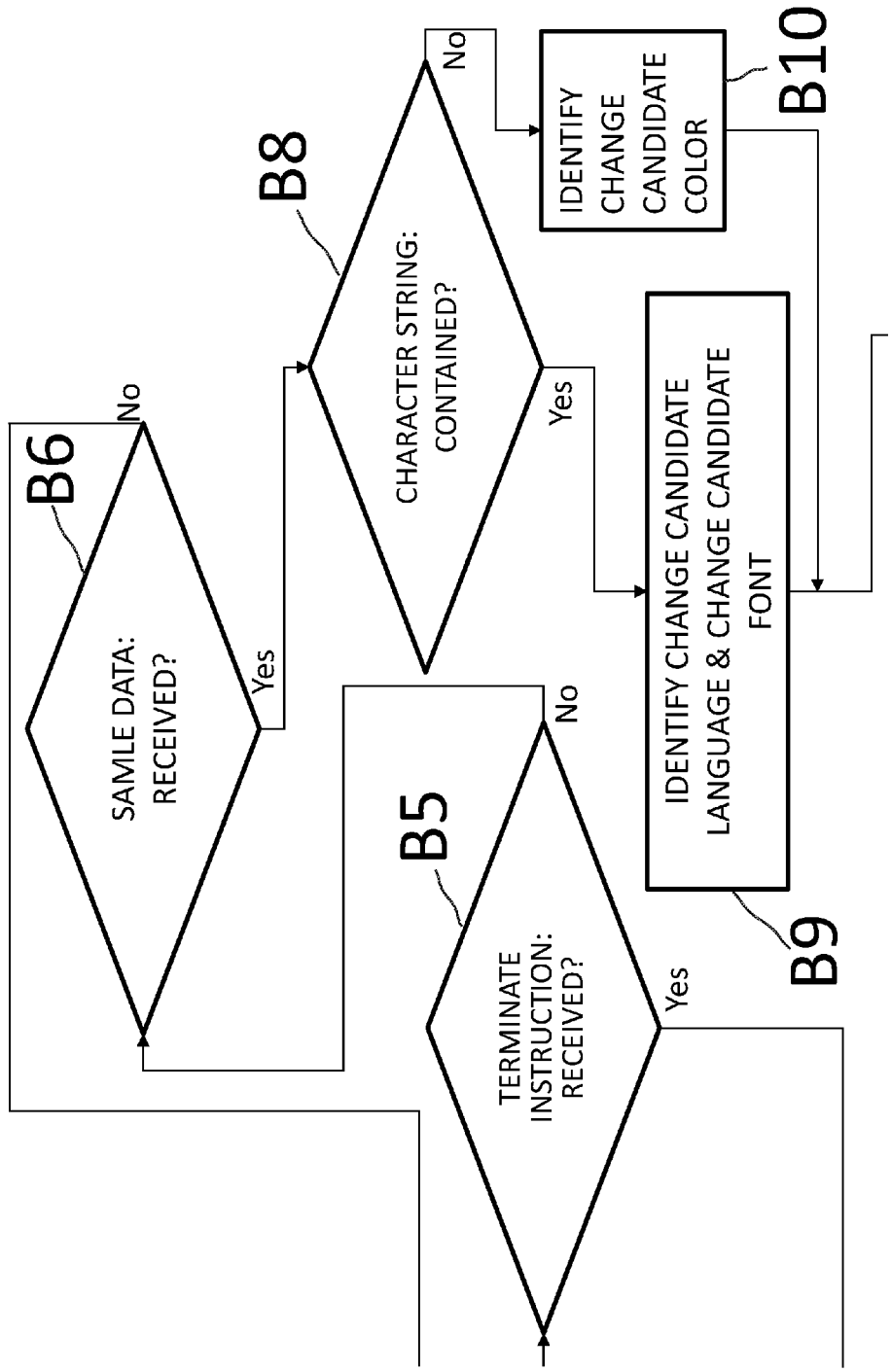
Figure 5D:
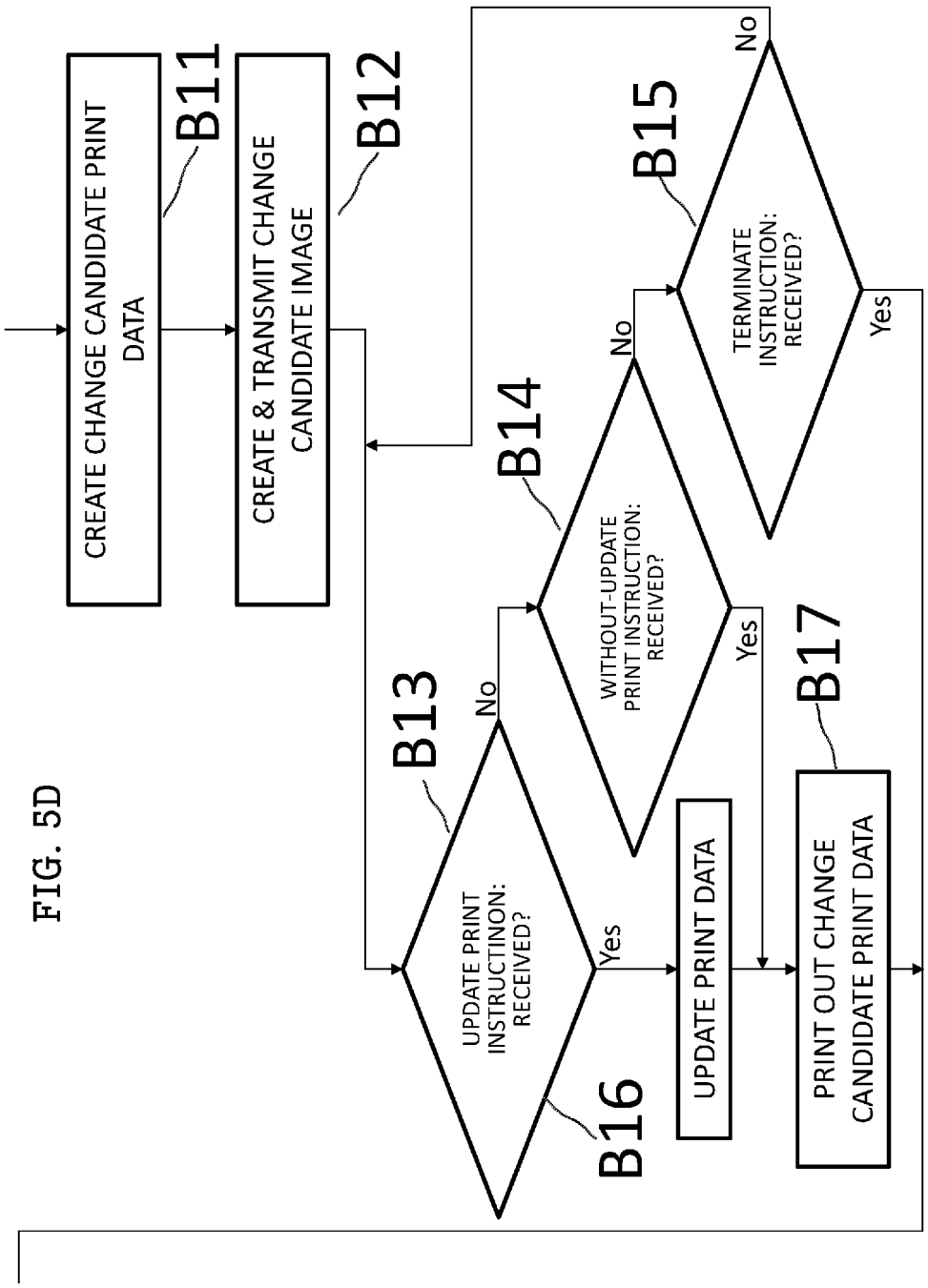

The print data list creation part 281 identifies the editable print data (document data including a character string) from among the print data stored in the storage part 23 and creates the print data list that is indicative list of file names of the identified print data. Then, the print data list creation part 281 transmits the created print data list, via the communication part 26, to the eyewear type terminal device 1 (FIG. 5A, Step B1).

Figure 4A:
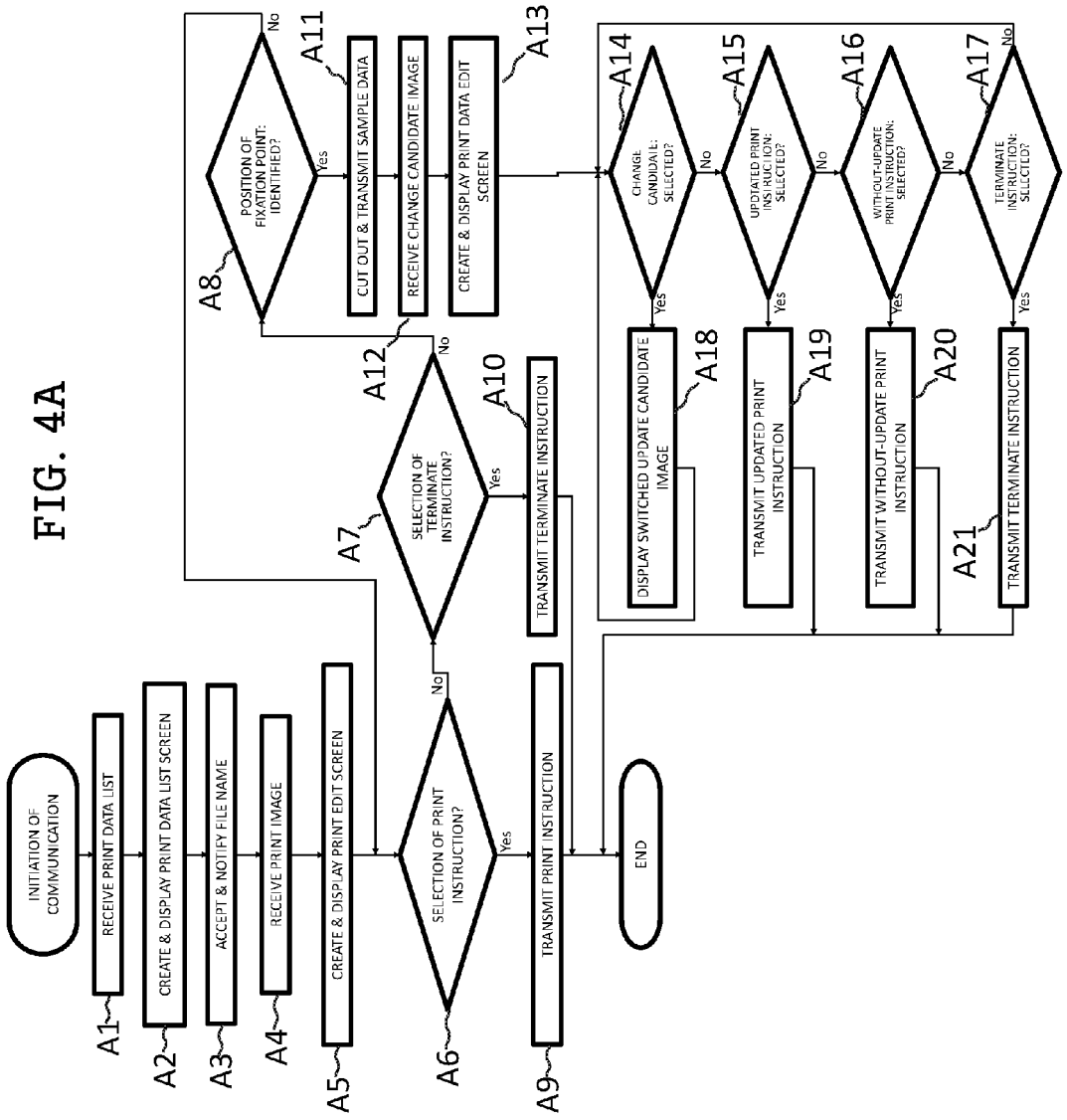
FIG. 4A is a flowchart that illustrates how print data undergoes a print operation at the eyewear type terminal device shown in FIG. 1.
Figure 6A:
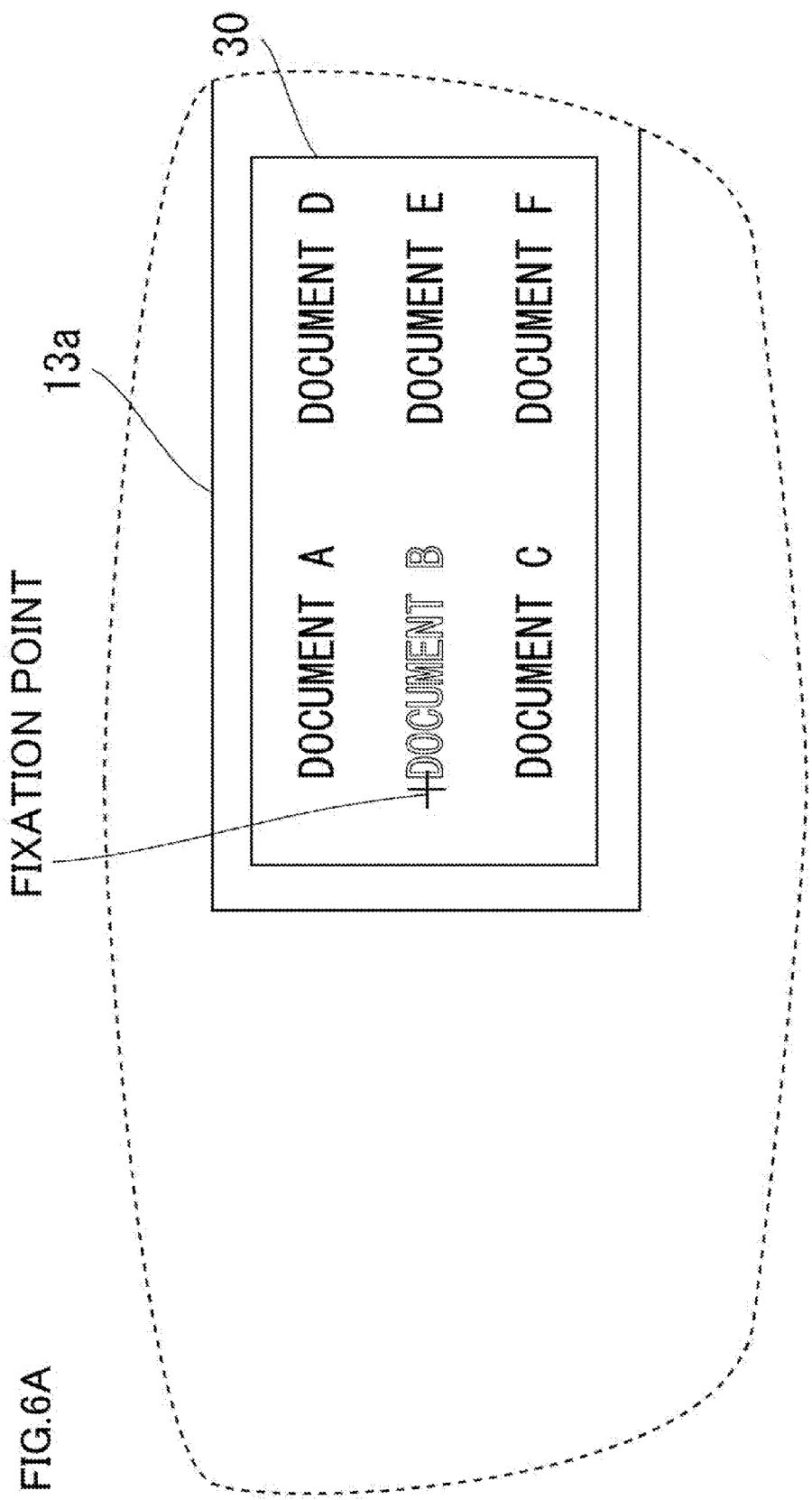
FIG. 6A is an illustration of an example that is indicated on a screen display part shown in FIG. 2.

When the control part 16 of the eyewear type terminal device 1 receives the created print data list, via the communication part 14, from the image forming apparatus 2 (FIG. 4A, Step A1), the control part 16 beings to act as the screen creation part 161. The screen creating part 161 creates, as shown in FIG. 6A, the print data list screen 30 on which is allocated the received print data list and to cause the half mirror 13a of the screen display part 13 to display the resulting print data list screen 30 (FIG. 4A, Step A2). On the print data list screen 30, file names of the print data list are a collection of select items one of which is to be selected by the user's fixation point.

Next, the control part 16 of the eyewear type terminal device 1 begins to act as the fixation point detection part 162. The fixation point detection part 162 detects a user's fixation point on the print data list screen 30 that is displayed on the half mirror 13a based on the fixation point detection image and accepts a selection item (file name) that is selected by the user's fixation point. It is to be noted that the fixation point detection part 162 notifies the selected item on which the fixation point lies by, for example, displaying the fixation point in a reverse fashion or surrounding the fixation point with a frame and accepts a selection item (file name) that is selected by the user's fixation point if the fixation point remains on such a selection item for a specified time period. Then, the fixation point detection part 162 notified the selected file name that is accepted, via the communication part 14, to the image forming apparatus 2 (FIG. 4A, Step A3).

The control part 28 of the image forming apparatus 2, when receives the file name that is received for selection from the eyewear type terminal device 1 via the communication part 26 (FIG. 5A, Step B2), begins to act as the print image creation part 282. The image creation part 282 backs up the print data whose file name is notified in Step B2, and creates a print image of the print data whose file name is notified in Step B2 and transmits the resulting or created print image to the eyewear type terminal device 1 via the communication part 26 (FIG. 5A, Step B3). Then, the control part 28 waits for receiving a print instruction, a terminate instruction, and sample data 44 (FIG. 5A, Steps B4, B5, and B6). It is to be noted that the print image to be transmitted to the eyewear type terminal device 1 is recommended to be changed depending on a resolution of the screen display part 13 of the eyewear type terminal device 1. In addition, though the print image may be created for all pages of the print data, creating an print image only for a representative page such as a front page makes it possible to reduce the creation related process and a communication traffic between the eyewear type terminal device 1 and the image forming apparatus 2.

The control part 16 of the eyewear type terminal device 1, when receives the print image from the image forming apparatus 2 via the communication part 14 (FIG. 4A, Step A4), begins to act as the screen creation part 161. The screen creation part 161 creates, as shown in FIG. 6B, the print data edit screen 40 on which the received print image is allocated and displays the created print data edit screen 40 on the half mirror 13a of the screen display part 13 (FIG. 4A, Step A5). On the print data edit screen 40, there are arranged a print instruction button 41 that is configured to instruct the image forming apparatus 2 to print the displayed print image and a termination instruction button 42 that is configured to provide an instruction to stop an edit operation, as select items that are to be selected by the user's fixation point. On the print data edit screen 40, there is also allocated an edit region 43 on which are displayed setting values of setting items (color, font, and language) as select items.

Next, the control part 16 of the eyewear type terminal device 1 acts as the fixation point detection part 162. The fixation point detection part 162 waits for a selection of the print instruction by the print instruction button 41, a selection of the termination instruction by the termination instruction button 42, and an identification of the fixation point position on the view image (FIG. 4A, Steps A6, A7, and A8). The fixation point detection part 162 detects the user's fixation point on the print data edit screen 40 that is displayed on the half mirror 13$a$ based on the fixation point detection image to accept a selection, which is made by the user's fixation point, of the selection items (the print instruction button 41 and the termination instruction button 42).

The user, when the print image that is displayed on the print data edit screen 40 is acceptable for him/her, positions his/her fixation point on the print instruction button 41, i.e. one of the selection items, on the print edit screen 40 for selecting the print instruction button 41. The fixation point detection part 162, when the print instruction by the print instruction button 41 is selected (FIG. 4A, Step A6), transmits a print instruction notification to the image forming apparatus 2 via the communication part 14 (FIG. 4A, Step A9) and terminates the print operation. Then, the control part 28 of the image forming apparatus 2, when receives the print instruction notification from the eyewear type terminal device 1 via the communication part 26 (FIG. 5A, Step B4), causes the print part 25 to print out the print data whose file name is notified in Step B2 (FIG. 5A, Step B7) and terminates the print operation.

Figure 4C:
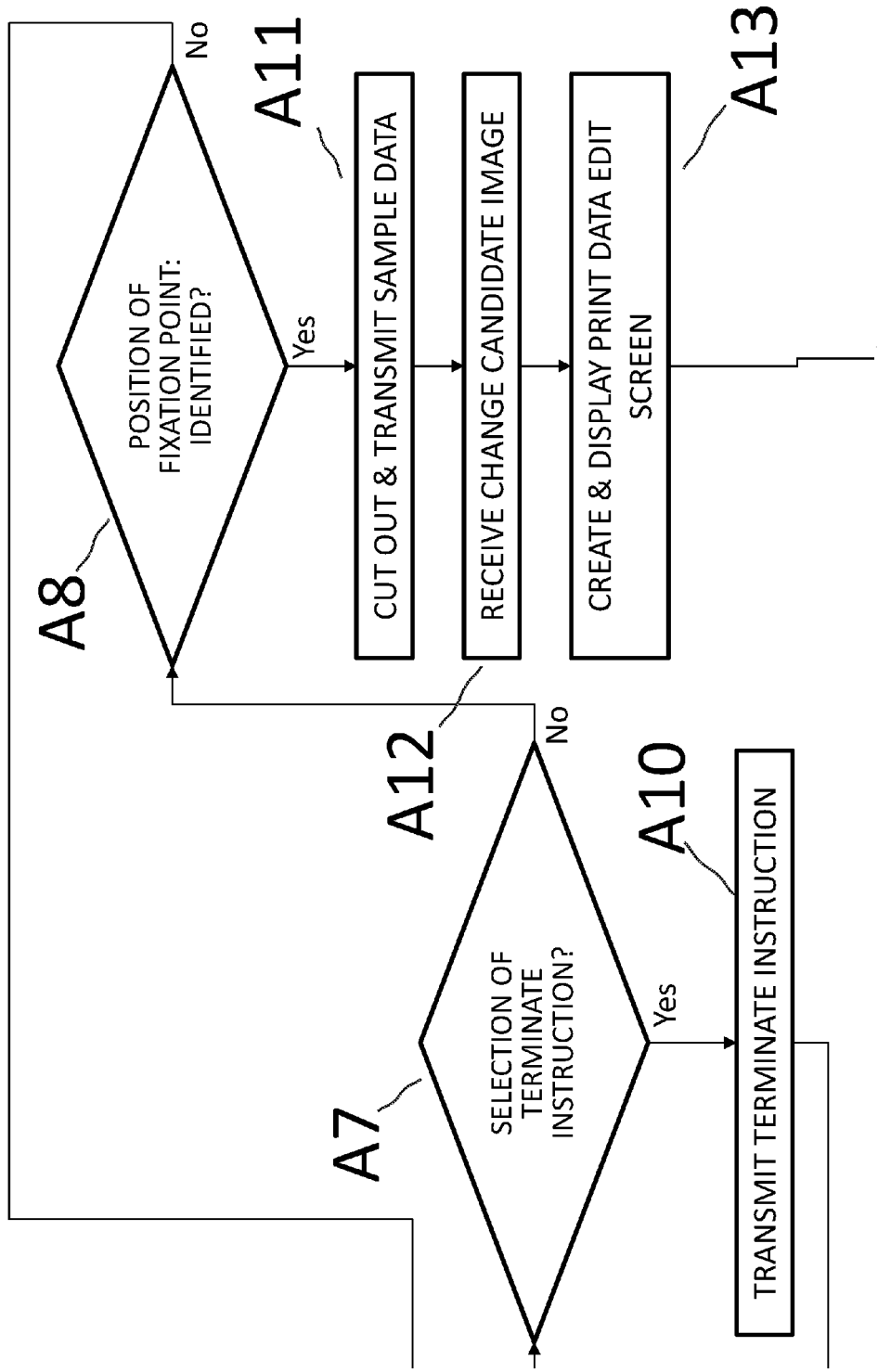
Figure 4D:
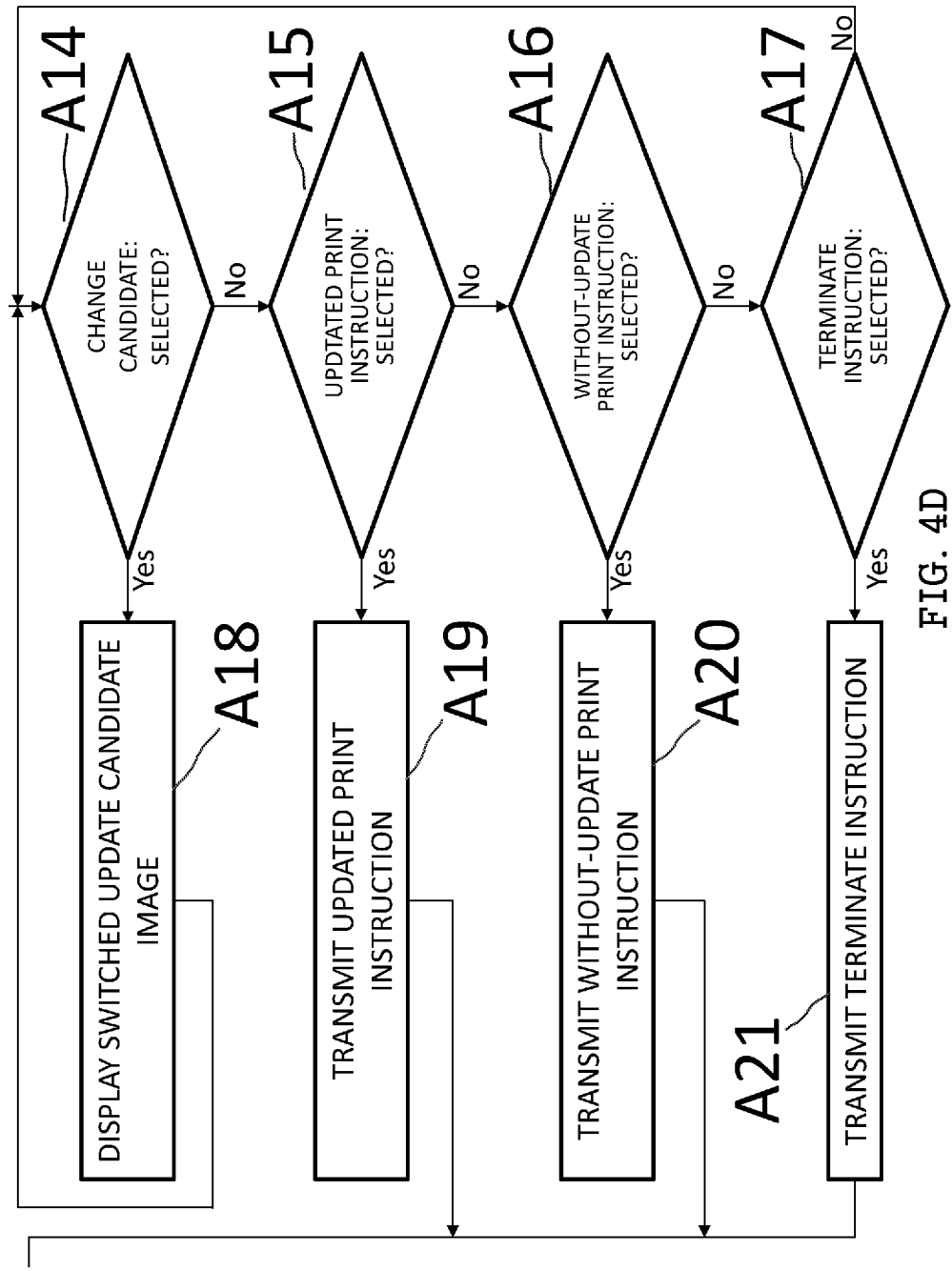

The user, when he/she wants to terminates the print operation, selects the terminate instruction button 42 by positioning his/her fixation point thereon which is one of the selection items on the print data edit screen 40. The fixation point detection part 162, when the termination instruction is selected by the termination instruction button 42 (FIG. 4, Step A7), transmits a termination instruction to the image forming apparatus 2 via the communication part 14 (FIG. 4A, Step A10) and terminates the print operation. Then, the control part 28 of the image forming apparatus 2, when receives the termination instruction from the eyewear type terminal device 1 via the communication part 26 (FIG. 5A, Step B5) also terminates the print operation.

On the other hand, when the user is not satisfied with the print image that is displayed on the print data edit screen 40 and therefore wants to edit the print image, the user employs, for example, a print material or an article on his/her surrounding desk as samples of to-be-changed color, font, and language, moves his/her fixation point on such samples, and causes the resulting fixation point to remain for a specified time period. Thereby, the fixation detection part 162 identifies the fixation point position on the view image. It is to be noted that selecting one of the selection items on the print data edit screen 40 takes a priority than identifying the fixation point position on the view image. When the fixation point position on the view image is identified by the fixation point detection part 162 (FIG. 4A, Step A8), the control part 16 of the eyewear type terminal device 1 begins to act as the sample data cutting out part 163. The sample data cutting out part 163 cuts out a specific region including the the fixation point identified by the fixation point detecting part 162 (for example, a rectangular region whose center is a specific position and which has a specified area) as sample data 44 and transmits the cut out sample data 44 to the image forming apparatus 2 via the communication part 14 (FIG. 4A, Step A11).

The control part 28 of the image forming apparatus 2, when receives the sample data 44 from the eyewear type terminal device 1 via the communication part 26 (FIG. 5A, Step B6), begins to act as the sample data analyzing part 284. The sample data analyzing part 284 determines whether or not the sample data contains therein a character string (FIG. 5A, Step B8) and if the sample data contains therein the character string, the sample data analyzing part 284 identifies that the language by which the character string is indicated as a change candidate language, selects plural fonts, which are similar, in shape, to the font of the character string of the sample data, from among plural fonts stored in the storage part 23, and identify the selected font as plural change candidate fonts (FIG. 5A, Step B9). Identifying the plural change candidate fonts are ranked in the descending similarity order. It is to be noted that the number (M pieces) of fonts to be identified may be defined in a suitable manner.

If no character string is included in the sample data 44, the sample data analyzing part 284 identifies a color in the sample data 44 as a changing candidate color (FIG. 5A, Step B10). If there are plural colors in the sample data 44, identifying the plural change candidate colors are ranked in the descending area size. It is to be noted that the number (N pieces) of change candidate colors to be identified may be defined in a suitable manner.

The sample data analyzing part 284, when identifies the change candidate language, the change candidate font, and the change candidate color, begins to act as the print data edit part 283. The print data edit part 283 creates a change candidate print data in which changings are made using the identified change candidate language, change candidate font, and change candidate color (FIG. 5A, Step B11). If the character string of the print data is different from the change candidate language that is identified by the sample data analyzing part 284, the print data edit part 283 changes the change candidate print data by translating the character string of the print data into the corresponding change candidate language to create a change candidate print data using the dictionary stored in the storage part 23. The print data edit part 283 also creates change candidate print data by causing the character string of the print data to be indicated by the change candidate font with the usage of one of the fonts stored in the storage part 23. Furthermore, the print data edit part 283 creates change candidate print data by causing the character string of the print data to be colored by the change candidate color. Thereby, M pieces of change candidate print data whose font is changed into the change candidate font, M pieces of change candidate print data whose language and font are changed respectively into the change candidate language and the change candidate font, N pieces of change candidate print data whose color is changed into the change candidate color, N×M pieces of change candidate print data whose language, font, and color are changed respectively into the change candidate language, the change candidate font, and the change candidate color, or N×M pieces of change candidate print data whose font and color are changed respectively into the change candidate font and the change candidate color is created. It is to be noted that though the change candidate print data may be created for all pages of the print data, creating the change candidate print data only for a representative page such as a front page makes it possible to reduce the creation related process. It may be also possible to create a change candidate print data by employing the first ranked change candidate font and the change candidate color.

The control part 28, when the print data edit part 283 creates the change candidate print data, begins to act as the print image creation part 282. The print image creation part 282 creates a print image of the change candidate print data that is created by the print data edit part 283 (hereinafter, the print image being referred to as a change candidate image) and transmits the change candidate image together with its change candidate language, change candidate font, and the change candidate color to the eyewear type terminal device 1 via the communication part 26 (FIG. 5A, Step B12). It is to be noted that when plural pieces of change candidate print data are created by the print data edit part 283, respective change candidate images are created and are transmitted to the eyewear type terminal device 1. Then, the control part 28 waits for a notification of a updated print instruction, a notification of non-updated print instruction, and a receipt of a termination instruction (FIG. 5A, Step B13, B14, and B15).

The control part 16 of the eyewear type terminal device 1, when receives the change candidate image from the image forming apparatus 2 via the communication part 14 (FIG. 4A, Step A12), begins to act as the screen creation part 161. The screen creation part 161 creates the print data edit screen 40a, as shown in FIG. 6C, on which is allocated the received change candidate image and causes the half mirror 13a to display the resulting print data edit screen 40a (FIG. 4A, Step A13). On the print data edit screen 40a, there are allocated, together with the change candidate image, a first print instruction button 41a and a second print instruction button 41b, the first print instruction button 41a being configured to make an update to the change candidate print data corresponding to the displayed change candidate image and instruct the image forming apparatus 2 to print out the displayed change candidate image, the second print instruction button 41b being configured to instruct the image forming apparatus 2 to print out the displayed change candidate image without having to change the print data. In addition, on the edit region 43 of the print data edit screen 40a, there are displayed the change candidate language, the change candidate font, and the change candidate color, as selection items. The change candidate image whose change candidate font is of the highest similarity and whose change candidate color is of the largest area is to be displayed as an initial value version.

Next, the control part 16 of the eyewear type terminal device 1 acts as the fixation point detection part 162. The fixation point detection part 162 waits for a selection of the change candidate of the edit region 43, a selection of the update print instruction by the first print instruction button 41a, a selection of the without-update print instruction by the second print instruction button 41b, and a selection of the terminate instruction by the terminate instruction button 42 (FIG. 4A, Steps A14, A15, A16, and A17).

In addition, the change candidate language, the change candidate font, and the change candidate color which correspond to the change candidate image that is displayed on the print data edit screen 40a are displayed, for example, in a framed manner or in a reverse mode as shown in FIG. 6C for notification to the user. Then, if the user has a plan to renew the change candidate image by using another change candidate language, another change candidate font, and/or another change candidate color, the user positions his/her fixation point on the another change candidate language, the another change candidate font, and/or the another change candidate color for selection thereof.

When the fixation point detection part 162 accepts the selection of another candidate in the edit region 43 (FIG. 4A, Step A14), the control part 16 begins to act as the screen creation part 161 and makes a switch to a change candidate image corresponding to the selected change candidate language, the change candidate font, and/or change candidate color (FIG. 4A, Step A18). Thereby, the user is capable of causing his/her eye to select his/her desired setting value(s) from among the limited setting values (change candidate language, change candidate font, and change candidate color).

When the user is satisfied with the change candidate image displayed on the print data edit screen 40a, the user positions his/her fixation on either one of the selection items that includes the first print instruction button 41a and the second print instruction button 41b for selection. For updating the print data to the displayed change candidate image, the first print instruction button 41a is selected and if no updating the print data is performed, the second print instruction button 41b is selected.

When the updating of print instruction is selected by the first print instruction button 41a (FIG. 4A, Step A15), the fixation point detection part 162 transmits a notification of the updating of print instruction for the displayed change candidate image to the image forming apparatus 2 via the communication part 14 (FIG. 4A, Step A19) and terminates the print operation. Then, the control part 28 of the image forming apparatus 2, when receives the resulting notification from the eyewear type terminal device 1 via the communication part 26 (FIG. 5A, Step B13), updates the print data whose file name is notified in Step B2 to the change candidate print data for the notified change candidate image (FIG. 5A, Step B16), causes the print part 25 to print the change candidate print data for the notified change candidate image (FIG. 5A, Step B17), and terminates the print operation. It is to be noted that when the change candidate print data is for a part of the page, the control part 28 acts as the print data edit part 283 in Step B17 to create change candidate print data for a full page and prints out the full page.

The fixation point detection part 162, when the print instruction without updating is selected by the second print instruction button 41b (FIG. 4A, Step A16), transmits a notification of the print instruction without updating the displayed change candidate image to the image forming apparatus 2 via the communication part 14 (FIG. 4A, Step A20) and terminates the print operation. Then, the control part 28 of the image forming apparatus 2, when receives the notification of the print instruction without updating (FIG. 5A, Step B14), causes the print part 25 to print out the change candidate print data for the notified change candidate image without updating the print data whose file name is notified in Step B2 (FIG. 5A, Step B17) and terminates the print operation.

When the user wants to stop the print operation, the user moves his/her fixation point on the terminate instruction button 42 which is one of the selection items on the print data edit screen 40a for selection. The fixation point detection part 162, when the termination instruction is selected by the termination instruction button 42 (FIG. 4A, Step A17), transmits a notification of terminate instruction to the image forming apparatus 2 via the communication part 14 (FIG. 4A, Step A21) and terminates the print operation. Then, the control part 28 of the image forming apparatus 2 also terminates the print operation when receives the notification of terminate instruction from the eyewear type terminal device 1 via the communication pert 26 (FIG. 5A, Step B15).

It is to be noted though the present exemplary embodiment is configured in such manner that the user's fixation point remains positioned within the specific range for a specified time period in order to select the one of the selection items on which the user's fixation point is positioned and identify the position of the user's fixation point, such a configuration that is added with the user's eye blink or the like may be possible also to select the one of the selection items on which the user's fixation point is positioned and identify the position of the user's fixation point. In addition, it may be possible to provide a user operated decision button to select the one of the selection items on which the user's fixation point is positioned and identify the position of the user's fixation point, when the decision button is manipulated. Furthermore providing an operation detection part is available which is, for example an acceleration detection sensor, configured to detect a specific action of the user in order to select the one of the selection items on which the user's fixation point is positioned and identify the position of the user's fixation point, when the specific action of the user is detected.

As detailed above, according to the present exemplary embodiment, a manipulation system is provided in which a eyewear type terminal device 1, which is configured to be mounted on a head of a user, controls an image forming apparatus 2 as a main body device, the eyewear type terminal device 1 including a view capturing part 11 that is configured to capture an image of a front vision field of the user, an eyeball capturing part 12 that is configured to capture an image of an eyeball of the user, a screen display part 13 that is configured to be visible for the user, a screen creating part 161 that is configured to create a screen on which selection items are arranged and display such a screen on the screen display part 13, a fixation point detecting part 162 that is configured to detect a fixation point of the user which is positioned on the screen display part 13 based on the image captured by the eyeball capturing part 12 and to accept an selection of one of the selection items which the user fixates, the fixation point detecting part 162 being configured to identify the fixated point position on the image that is captured by the view capturing part 11 based on the eyeball capturing part 12, a sample data cutting out part 163 that is configured to cut out sample data 44 from the image that is captured by the view capturing part 11 based on the fixated point position that is identified by the fixation point detecting part 162, and a communication part 14 that is configured to transmit, to the image forming apparatus 2, the one of the selection items which is accepted, as a selection, by the fixation point detecting part and the sample data 44 that is cut out by the sample data cutting out part 163, the image forming apparatus 2 including a control part 28 that is configured to execute an operation based on the selected one of the selection items which is received from the eyewear type terminal device 1, a sample data analyzing part 284 that is configured to identify a setting value candidate treated as the selected one of the selection items which is to be displayed on the screen display part 13 of the eyewear type terminal device 1, and a communication part 26 that is configured to transmit the setting value candidate to the eyewear type terminal device 1.

With this configuration, it is possible to identify a setting value candidate treated as the selected one of the selection items based on the cut-out sample data 44 that relies on the user's fixation point. Thus, even though there are many selectable setting values, selecting the setting value candidate makes it possible for the user to execute his/her user wanted operation in an easy way from the eyewear type terminal device 1, which leads to an improvement in handling the above selection.

Further, the present exemplary embodiment is configured such that the main body device is in the form of the image forming apparatus 2 that is configured to print out print data, the sample data analyzing part 284 of the image forming apparatus 2 identifies the change candidate font as the setting value candidate, and the control part 28 (the print data edit part 283) of the image forming apparatus 2 edits the print data using the change candidate font that is received as one of selection items from the eyewear type terminal device 1 and prints out the resulting print data.

With this configuration, selecting the change candidate font which is enabled at the eyewear type terminal device 1 allows the user to edit the print data in an easy way, thereby improving convenience.

Moreover, the present exemplary embodiment is configured such that the main body device is in the form of the image forming apparatus 2 that is configured to print out print data, the sample data analyzing part 284 of the image forming apparatus 2 identifies the change candidate color as the setting value candidate, and the control part 28 (the print data edit part 283) of the image forming apparatus 2 edits the print data using the change candidate color that is received as one of the selection items from the eyewear type terminal device 1 and prints out the resulting print data.

With this configuration, selecting the change candidate color which is enabled at the eyewear type terminal device 1 allows the user to edit the print data in an easy way, thereby improving convenience.

In a typical manipulation system, when a selection is made from among setting values of the operation items, such a selection is made on the user's eye tracking and therefore the number of the setting values is limited which can displayed on a display device, which may arise a drawback that cannot coping with a manipulation that deals with many setting values.

The present disclosure, which has been made in view of the aforementioned problems, has an object to provide a manipulation system which makes it possible to cope with a manipulation that deals with many selectable setting values in an easy way using an eyewear type terminal device that is followed by an improvement in convenience.

According to the present disclosure, using the sample data 44 that is cut out based on the user's fixation point provided an identification of the setting value candidate as the selection item that the user selects. Consequently, effects are derived such that even though there are many setting values to be selected the user, the user can conduct his/her desired manipulation in an easy way by selecting the setting value candidate at the eyewear type terminal device, which is followed by an improvement in convenience.

It is to be noted that the present the present disclosure is not limited to the aforementioned exemplary embodiments and therefore manifestly it is capable of any modification without departing from the basic concept of the present disclosure. In addition, the number of each the elements, and the attributes of each the of the elements which include, for example, position and shape are not limited to ones shown in the aforementioned exemplary embodiments, and therefore may be modified in a suitable manner for carrying out the present disclosure. It is to be noted that the same elements are referred to by the same reference codes in each drawing.

What is claimed is:

1. A manipulation system comprising:
   a main body device; and
   an eyewear type terminal device that is configured to be mounted on a head of a user, the eyewear type terminal device including
a view capturing part that is configured to capture an image of a front vision field of the user,
an eyeball capturing part that is configured to capture an image of an eyeball of the user,
a screen display part that is configured to be visible for the user,
a screen creating part that is configured to create a screen on which selection items are arranged and display such a screen on the screen display part,
a fixation point detecting part that is configured to detect a fixation point of the user which is positioned on the screen display part based on the image captured by the eyeball capturing part and to accept a selection of one of the selection items which the user fixates, the fixation point detecting part being configured to identify the fixated point position on the image that is captured by the view capturing part based on the eyeball capturing part,
a sample data cutting out part that is configured to cut out sample data from the image that is captured by the view capturing part based on the fixated point position that is identified by the fixation point detecting part, and
a terminal communication part that is configured to transmit, to the main body device, the one of the selection items which is accepted, as a selection, by the fixation point detecting part and the sample data that is cut out by the sample data cutting out part, the main body device including a control part that is configured to execute an operation based on the selected one of the selection items which is received from the eyewear type terminal device, a sample data analyzing part that is configured to identify a setting value candidate treated as the selected one of the selection items which is to be displayed on the screen display part of the eyewear type terminal device, and a main body communication part that is configured to transmit the setting value candidate to the eyewear type terminal device.

2. The manipulation system according to claim 1, wherein the main body device is in the form of an image forming apparatus that is configured to print out print data, the sample data analyzing part of the main body device identifies the change candidate font as the setting value candidate, and the control part of the main body device edits the print data using the change candidate font that is received as one of selection items from the eyewear type terminal device and prints out the resulting print data.

3. The manipulation system according to claim 1, wherein the main body device is in the form of an image forming apparatus that is configured to print out print data, the sample data analyzing part of the main body device identifies the change candidate color as the setting value candidate, and the control part of the main body part edits the print data using the change candidate color that is received as one of the selection items from the eyewear type terminal device and prints out the resulting print data.

* * * * *